(12) United States Patent
Ito et al.

(10) Patent No.: US 11,791,726 B2
(45) Date of Patent: Oct. 17, 2023

(54) POWER CONVERSION DEVICE

(71) Applicant: TOYOTA JIDOSHA KABUSHIKI KAISHA, Toyota (JP)

(72) Inventors: Masayuki Ito, Sunto-gun (JP); Tomohiko Kaneko, Ashigarakami-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 17/445,724

(22) Filed: Aug. 23, 2021

(65) Prior Publication Data
US 2022/0069707 A1 Mar. 3, 2022

(30) Foreign Application Priority Data
Aug. 25, 2020 (JP) .................... 2020-141754

(51) Int. Cl.
*H02M 3/158* (2006.01)
(52) U.S. Cl.
CPC ........ *H02M 3/158* (2013.01); *H01M 2250/20* (2013.01)
(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 2003/1566; H02M 2003/1557; H02M 2001/0012; H02M 2001/0009; H02M 2001/385; H04B 2215/069
See application file for complete search history.

(56) References Cited

U.S. PATENT DOCUMENTS

| 10,454,372 | B2 | 10/2019 | Kitamoto | |
|---|---|---|---|---|
| 10,749,442 | B2 | 8/2020 | Kitamoto | |
| 2019/0348918 | A1* | 11/2019 | Ojika | H02M 3/1588 |

FOREIGN PATENT DOCUMENTS

| JP | 6450884 B2 | 1/2019 |
|---|---|---|
| JP | 6507305 B2 | 4/2019 |

* cited by examiner

*Primary Examiner* — Bryan R Perez
(74) *Attorney, Agent, or Firm* — Hunton Andrews Kurth LLP

(57) ABSTRACT

To provide a power conversion device configured to evenly pass current through phases and to achieve high power conversion efficiency in a wide current range. A power conversion device comprising conversion parts which are coupled in parallel to each other, which are capable of voltage conversion, and each of which includes a coil, wherein the power conversion device comprises M (M is a natural number of 2 or more) sets of conversion sets including the conversion parts of N phases (N is a natural number of 2 or more), and the coils of the conversion parts are capable of magnetic coupling to each other; wherein the power conversion device includes a controller configured to change a driving phase number X of the conversion parts according to a system requirement.

5 Claims, 2 Drawing Sheets

POWER CONVERSION DEVICE

CROSS-REFERENCE TO RELATED APPLICATION

This application claims priority to Japanese Patent Application No. 2020-141754 filed on Aug. 25, 2020, which is incorporated herein by reference in its entirety.

TECHNICAL FIELD

The disclosure relates to a power conversion device.

BACKGROUND

There has been considerable research on a power conversion device (hereinafter, it may be referred to as "converter") used in a fuel cell system installed in a vehicle such as a fuel cell electric vehicle (FCEV).

As an item for miniaturization of a voltage conversion circuit, such a magnetically coupled reactor has been considered, that the inductors (coils) of several phases, which have been independent of each other, are formed into a coupling inductor by consolidating the winding wires to a single magnetic core. In the magnetically coupled reactor, there is a part where they are affected by each other by the magnetic fields of the inductors of their phases to lower the gradient of a curve of current vs. time, and voltage conversion efficiency due to a reduction in current amplitude, can be enhanced.

As the technique using the magnetically coupled reactor, for example, a power supply device including a conversion module including M sets of conversion unit sets that 2 phases are magnetically coupled to each other, is disclosed in Patent Literatures 1 and 2.
Patent Literature 1: U.S. Pat. No. 6,450,884
Patent Literature 2: U.S. Pat. No. 6,507,305

A fuel cell electric vehicle has a limitation in the amount of an installed secondary battery. Accordingly, of the total output required from the vehicle, the proportion of the output required to the fuel cell, that is, the range of required output is enlarged.

In a converter, as the number of the phases of a driving reactor increases, the position of a peak at which high power conversion efficiency is obtained, is shifted to a high current range side. In the case of using a fuel cell only in a narrow required output range, even if driven only by the number of phases that can use magnetic coupling (each set), since a peak shift itself is small, the corresponding converter can be operated in the whole output range with almost no decrease in efficiency. On the other hand, when the required output range is enlarged, the peak shift itself accompanied by an increase in the number of the phases is increased. To achieve high efficiency over the whole required output range, accordingly, it is needed to be driven by the number of phases using a single phase that does not use magnetic coupling, etc.

In the constitutions of Patent Literatures 1 and 2, while the conversion part has a total of 2×M phases, the number of operable phases is only a multiple of 2, and they cannot be always operated by the optimal number of phases and may result in a decrease in power conversion efficiency. For example, in the case of a conversion module including three sets of conversion parts in each of which two phases are magnetically coupled to each other, it can be driven by 2, 4, 6 phases; however, there is a possibility that it cannot be efficiently driven by 3 phases. In particular, for example, in the case of a converter with magnetically coupled conversion parts of 2 phases×3 sets, assume that both of the 2 phases are driven in one conversion set; only one phase is driven in one of the remaining two conversion sets; and none of the phases is driven in the remaining one conversion set. In this case, one conversion set is magnetically coupled and operated, and one of the remaining two conversion sets is not magnetically coupled and is operated. Accordingly, there is a difference in power conversion efficiency between them. Accordingly, current (load) concentrates on one conversion set side that is magnetically coupled and driven to achieve efficient power conversion, resulting in an imbalance of current between the three driven phases. Accordingly, a power conversion efficiency increasing effect cannot be obtained. Even if interleave control is carried out, input and output current ripple is enlarged. Accordingly, unstable control or an increase in the size of a smoothing capacitor for ripple inhibition, is caused.

SUMMARY

The disclosed embodiments were achieved in light of the above circumstances. An object of the disclosed embodiments is to provide a power conversion device configured to evenly pass current through the phases and to achieve high power conversion efficiency in a wide current range.

In a first embodiment, there is provided a power conversion device comprising conversion parts which are coupled in parallel to each other, which are capable of voltage conversion, and each of which includes a coil,
wherein the power conversion device comprises M (M is a natural number of 2 or more) sets of conversion sets including the conversion parts of N phases (N is a natural number of 2 or more), and the coils of the conversion parts are capable of magnetic coupling to each other;
wherein the power conversion device includes a controller configured to change a driving phase number X of the conversion parts according to a system requirement; and
wherein, when the driving phase number X is not a multiple of N (a condition (A)) and when the driving phase number X is represented by a product YZ of the conversion part of Y phase (Y is a natural number of N−1 or less) and Z (Z is a natural number of 2 or more and M or less) sets of the conversion sets (a condition (B)), among the conversion parts of N phases included in each of Z sets of the conversion sets, the controller drives the conversion part of Y phase, and the controller does not drive the conversion parts of all N phases included in each of remaining (M−Z) sets of the conversion sets.

When the driving phase number X is not a multiple of N (the condition (A)) and the driving phase number X is represented by a set number of Z (Z is a natural number of 2 or more and M or less) sets of the conversion sets (a condition (B')), among the conversion parts of N phases included in each of Z sets of the conversion sets, the controller may drive the conversion part of 1 phase, and the controller does not need to drive the conversion parts of all N phases included in each of remaining (M−Z) sets of the conversion sets.

A phase number N of the conversion parts included in each conversion set may be 2.

When the driving phase number X is a multiple of N (a condition Not (A)), the controller may drive the conversion parts of all N phases included in each of X/N sets of the conversion sets, and the controller does not need to drive the conversion parts of all N phases included in each of remaining (M−X/N) sets of the conversion sets.

When the driving phase number X is not a multiple of N (the condition (A)) and the driving phase number X cannot be represented by a product YZ of the conversion parts of Y (Y is a natural number of N−1 or less) phases and Z (Z is a natural number of 2 or more and M or less) sets of the conversion sets (a condition Not (B)), the controller may change the driving phase number X of the conversion parts to a driving phase number X' different from the driving phase number X.

The controller may select a driving phase number X of the conversion part to satisfy at least one of the condition Not (A) that the driving phase number X is a multiple of N and the condition (B) that the driving phase number X is represented by a product YZ of the conversion part of Y (Y is a natural number of N−1 or less) phase and Z (Z is a natural number of 2 or more and M or less) sets of the conversion sets.

The power conversion device of the disclosed embodiments can evenly pass current through the phases and can achieve high power conversion efficiency in a wide current range.

BRIEF DESCRIPTION OF THE DRAWINGS

In the accompanying drawings.

DETAILED DESCRIPTION

Figure 1:
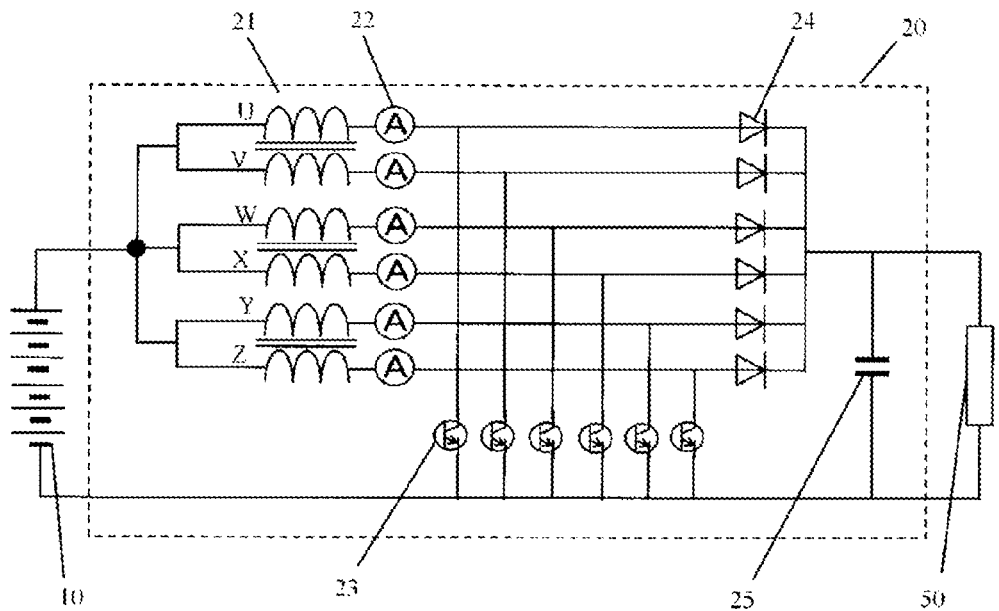
FIG. 1 is a view of an example of the circuit configuration of a system including a boost converter and peripherals.

The power conversion device of the disclosed embodiments is a power conversion device comprising conversion parts which are coupled in parallel to each other, which are capable of voltage conversion, and each of which includes a coil, wherein the power conversion device comprises M (M is a natural number of 2 or more) sets of conversion sets including the conversion parts of N phases (N is a natural number of 2 or more), and the coils of the conversion parts are capable of magnetic coupling to each other;

wherein the power conversion device includes a controller configured to change a driving phase number X of the conversion parts according to a system requirement; and wherein, when the driving phase number X is not a multiple of N (a condition (A)) and when the driving phase number X is represented by a product YZ of the conversion part of Y phase (Y is a natural number of N−1 or less) and Z (Z is a natural number of 2 or more and M or less) sets of the conversion sets (a condition (B)), among the conversion parts of N phases included in each of Z sets of the conversion sets, the controller drives the conversion part of Y phase, and the controller does not drive the conversion parts of all N phases included in each of remaining (M−Z) sets of the conversion sets.

According to the disclosed embodiments, control can be simplified by preventing, when selecting which phase to be driven by output and the number of driving phases appropriate for it, the presence of magnetically coupled conversion sets and non-magnetically coupled conversion sets in a mixed manner.

In the power conversion device of the disclosed embodiments, the selected conversion parts are not magnetically coupled to each other, or the conversion parts with the same phase number of the conversion sets are magnetically coupled. According to the disclosed embodiments, therefore, an imbalance in current due to the presence or absence of magnetic coupling or due to a difference in the level of magnetic coupling (for example, 3 phases magnetic coupling and 2 phases magnetic coupling are mixed) is not caused. Accordingly, current can be evenly passed through the phases. In addition, since the number of driving phases may be a number which is not a multiple of N, high power conversion efficiency can be achieved in a wide current range.

The power conversion device of the disclosed embodiments includes at least a conversion part, a conversion set and a controller.

The converter may be a boost converter, a buck converter or a buck-boost converter.

The power conversion device of the disclosed embodiments includes conversion parts of several phases. The conversion parts of several phases are connected in parallel to each other, and each of them includes one coil. The coil may be wound on the core of a desired reactor.

The conversion part is a circuit for voltage conversion. It includes a reactor including a core and a coil wound on the core; a switch for switching on or off the flow of current to one coil wound on the core included in the reactor, a diode, etc. As needed, it includes a current sensor for detecting current flowing through the reactor or coil, etc.

The reactor may include one core and one or more coils wound on the core. Each coil of the reactor may be a part of the configuration of the circuit of each conversion part. Also, the coils of magnetically coupled conversion parts magnetically coupled to each other, may share the core of one reactor. No particular limitation is imposed on core and coil, and a core and coil used in a conventionally-known reactor may be employed.

The switch may be a switching device such as IGBT and MOSFET.

The conversion sets include, among the conversion parts, the conversion parts of N phases (N is a natural number of 2 or more), and the coils of the conversion parts are capable of magnetic coupling to each other.

The power conversion device of the disclosed embodiments includes M (M is a natural number of 2 or more) sets of conversion sets. M is not particularly limited, as long as it is a natural number of 2 or more. It may be appropriately determined according to output required of the power conversion device. For example, M may be 100 or less, 20 or less, 15 or less, 10 or less, 6 or less, 4 or less, or 3 or less.

The state that the coils are capable of magnetic coupling to each other, is the following state: the core of a reactor is shared by the coils.

The state that the coils are magnetically coupled to each other, means the following state: the core of a reactor is shared by the coils, and current is passed through the coils to electrically connect the coils.

On the other hand, the state that the coils are not magnetically coupled to each other, may be the following state: even if the core of a reactor is shared by the coils, in a conversion set which is a set of conversion parts including the coils sharing the core, among the conversion parts included in the conversion set, only the conversion part of 1 phase is driven. Also, it may be the following state: only one coil is wound on the core of a reactor to drive a conversion part including the reactor.

In the disclosed embodiments, conversion parts in a magnetically coupled state may be referred to as "magnetically coupled conversion parts", and conversion parts in a non-magnetically coupled state may be referred to as "non-magnetically coupled conversion parts".

The total number of the phases of the conversion parts included in the power conversion device of the disclosed embodiments, may be N×M phases.

FIG. 1 is a view of an example of the circuit configuration of a system including a boost converter and peripherals.

The system shown in FIG. 1 is installed in a vehicle, for example. As an external load 50, a motor for driving the vehicle is connected through an inverter. Also, a battery (not shown) may be included in parallel to a fuel cell 10 and a boost converter 20. The output power of the fuel cell 10 is boosted by the boost converter 20, converted from DC to AC by the inverter, and then supplied to the motor. The boost converter 20 shown in FIG. 1 corresponds to the power conversion device of the disclosed embodiments. The boost converter 20 includes booster circuits (conversion parts) of 6 phases which are connected in parallel to each other, and the booster circuits include a reactor 21, a current sensor 22, a switching device 23, a diode 24 and a capacitor 25. Of the booster circuits of 6 phases, every 2 phases share the core of one reactor 21 to be magnetically coupled to each other.

The output power of the fuel cell 10 is largely changed by vehicle requirements (such as speed, acceleration rate, load capacity and road gradient), and the output current is largely changed according to them. When the output current of the fuel cell 10 is large and the current is passed through one booster circuit, an increase in heat generation occurs to decrease the power conversion efficiency. Even when small current is passed through a booster circuit that is resistant to large current, an increase in loss occurs to decrease the power conversion efficiency. Accordingly, the boost converter 20 includes booster circuits of several phases (6 phases in the example shown in FIG. 1), and depending on the size of the output current of the fuel cell 10, the current is passed through the booster circuit of 1 phase when the current is small, and the current is passed through the booster circuits of several phases in fractions when the current is large. Accordingly, efficient boosting in a wide current range is possible.

According to the system requirement, the controller changes the driving phase number X which is the phase number of driving conversion parts.

The controller physically includes, for example, a processing unit such as a central processing unit (CPU), memory devices such as a read-only memory (ROM) for storing control programs, control data and so on processed in the CPU and a random-access memory (RAM) used mainly as various workspaces for control processes, and an input-output interface. Also, the controller may be a control device of an engine control unit (ECU), for example.

The controller may be connected to a switch, a current sensor and so on through the input-output interface. Also, the controller may be electrically connected to an ignition switch that may be installed in the vehicle.

The controller is electrically connected to the switch, and according to a system requirement, it controls the output voltage of the converter to satisfy necessary voltage required from the vehicle, etc. For example, by controlling the switch of the conversion part to on or off, the controller controls the driving phase number of the conversion part to control the output voltage of the converter.

The system requirement may be the required output of the whole system obtained from information such as the speed of the vehicle, the accelerator position of the vehicle, and the load of a system auxiliary instrument and a vehicle auxiliary instrument.

When the driving phase number X is not a multiple of N (the condition (A)) and when the driving phase number X is represented by a product YZ of the conversion part of Y phase (Y is a natural number of N−1 or less) and Z (Z is a natural number of 2 or more and M or less) sets of the conversion sets (the condition (B)), among the conversion parts of N phases included in each of Z sets of the conversion sets, the controller drives the conversion part of Y phase, and the controller does not need to drive the conversion parts of all N phases included in each of remaining (M−Z) sets of the conversion sets.

Driving the conversion part of Y phase does not mean that among the conversion parts of N phases included in the conversion sets, all N phases are driven. It means that among the conversion parts of N phases, only Y phase is driven.

Also, YZ means Y×Z that is the product of Y and Z.

When the driving phase number X is 1 (a condition (C)), the controller may drive the conversion part of any 1 phase.

The phase number N of the conversion parts included in each conversion set is not particularly limited, as long as it is a natural number of 2 or more. It may be 2 or 3, or it may be 2.

When N is 3 or more, the percentage of the driving phase number satisfying the conditions (A) and (B) decreases, and the percentage of the driving phase number that is unusable, increases. Since N is 2, when the total phase number of the conversion parts is 2×M phases, driving by all phase numbers equal to M phases or less including the 1 phase driving of the condition (C) is possible, and high power conversion efficiency can be achieved in a wide current range.

As long as the phase number N of the conversion parts included in each conversion set is a natural number of 2 or more, they may be phase numbers different from each other, or they may be the same phase number. From the viewpoint of control simplification, the phase number N of conversion parts included in all conversion sets may be the same.

Hereinafter, examples of the case where the conditions (A) and (B) are satisfied, will be described. The disclosed embodiments are not limited to the following examples, and the disclosed embodiments encompass any cases where the conditions (A) and (B) are satisfied.

First, examples of the conversion set that the conversion parts of 2 phases are capable of magnetic coupling to each other, will be described.

For example, in a converter including 4 sets of conversion sets that the conversion parts of 2 phases are capable of magnetic coupling to each other, among the conversion parts of a total of 8 phases, only the conversion parts of 3 phases are driven. In this case, X is 3; N is 2; M is 4; Y is 1; Z is 3; YZ is 3; and among the conversion parts of 2 phases included in each of 3 of 4 sets of the conversion sets, the conversion part of 1 phase is driven, and the conversion parts of 2 phases of remaining 1 set of the conversion set are not driven. That is, the driving phase is selected so that the phase number of the conversion parts driven in 4 sets of the conversion sets will be any of (1,1,1,0), (1,1,0,1), (1,0,1,1) and (0,1,1,1).

For example, in a converter including 5 sets of conversion sets that the conversion parts of 2 phases are capable of magnetic coupling to each other, among the conversion parts of a total of 10 phases, only the conversion parts of 3 phases are driven. In this case, X is 3; N is 2; M is 5; Y is 1; Z is 3; YZ is 3; and among the conversion parts of 2 phases included in each of 3 of 5 sets of the conversion sets, the conversion part of 1 phase is driven, and the conversion parts of 2 phases of remaining 2 sets of the conversion sets are not driven.

For example, in a converter including 5 sets of conversion sets that the conversion parts of 2 phases are capable of magnetic coupling to each other, among the conversion parts of a total of 10 phases, only the conversion parts of 5 phases are driven. In this case, X is 5; N is 2; M is 5; Y is 1; Z is 5; YZ is 5; and among the conversion parts of 2 phases included in each of 5 sets of the conversion sets, the conversion part of 1 phase is driven. The same control can be performed even when N is 2 and X is an odd number of 7 or more.

Next, examples of the conversion set that the conversion parts of 3 phases or more are capable of magnetic coupling to each other, will be described.

For example, in a converter including 2 sets of conversion sets that the conversion parts of 3 phases are capable of magnetic coupling to each other, among the conversion parts of a total of 6 phases, only the conversion parts of 2 phases are driven. In this case, X is 2; N is 3; M is 2; Y is 1; Z is 2; YZ is 2; and the conversion part of 1 phase from each of 2 sets of the conversion sets, is driven.

For example, when X is 2 and the conversion parts of 2 phases are driven, only the conversion parts of 2 phases of any one of 2 sets of the conversion sets are driven and the conversion parts of all phases of the other conversion set are not driven. When the driving phase number of the conversion parts is changed from 1 phase to 3 phases, the other conversion set performs control to switch to any one of driving only the conversion part of 1 phase, driving only the conversion parts of 2 phases (magnetic coupling) and driving all of the conversion parts of 3 phases (magnetic coupling). In this situation, control conditions such as feedback gain differ between these cases, and the control becomes complex, accordingly.

Meanwhile, for example, when the conversion parts of 2 phases are driven, like the disclosed embodiments, the conversion part of 1 phase from each of 2 sets of the conversion sets, is driven. In this case, the control can be simplified because the control conditions are the same as those of the case of driving the conversion part of only 1 phase.

When only the conversion parts of 4 phases are driven here, X is 4; N is 3; M is 2; Y is 2; Z is 2; YZ is 4; and 2 sets of the conversion sets drive the conversion parts of 2 phases.

For example, in a converter including 4 sets of conversion sets that the conversion parts of 3 phases are capable of magnetic coupling to each other, among the conversion parts of a total of 12 phases, only the conversion parts of 2 phases are driven. In this case, X is 2; N is 3; M is 4; Y is 1; Z is 2; YZ is 2; and 2 of 4 sets of the conversion sets drive the conversion part of 1 phase, and the remaining 2 sets do not drive any conversion part.

When only the conversion parts of 4 phases are driven, X is 4; N is 3; M is 4; Y is 1 or 2; Z is 4 or 2; YZ is 4; and the conversion part of 1 phase from each of 4 sets of the conversion sets is driven, or 2 of 4 sets of the conversion sets drive the conversion parts of 2 phases, and the remaining 2 sets do not drive any conversion part.

When only the conversion parts of 8 phases are driven, X is 8; N is 3; M is 4; Y is 2; Z is 4; YZ is 8; and the conversion parts of 2 phases from each of 4 sets of the conversion sets are driven.

Accordingly, current imbalance, which is due to the mixing of, for example, 3 phases magnetic coupling and 2 phases magnetic coupling, do not occur and current can be evenly passed through the phases. The control becomes complex if, at the time of selecting by which phase the controller is driven, the case where only 2 phases in the conversion sets are magnetically coupled and driven and the case where 3 phases in the conversion sets are magnetically coupled and driven, are mixed, for example. However, the control can be simplified by selecting the driving phase so as not to mix the magnetically coupled conversion sets and the non-magnetically coupled conversion sets. In addition, since the driving phase number is not limited to a multiple of N, high power conversion efficiency can be achieved in a wide current range.

When the driving phase number X is not a multiple of N (the condition (A)) and the driving phase number X is represented by the set number of Z (Z is a natural number of 2 or more and M or less) sets of the conversion sets (the condition (B')), among the conversion parts of N phases included in each of Z sets of the conversion sets, the controller drives the conversion part of 1 phase, and the controller does not need to drive the conversion parts of all N phases included in each of remaining (M−Z) sets of the conversion sets.

The condition (B') is the case where Y in the condition (B) is 1. A control to switch only the cases where only the conversion part of 1 phase in the conversion sets is not magnetically coupled and is driven by satisfying the conditions (A) and (B') and where all N phases are magnetically coupled and driven by satisfying the condition Not (A), may be performed, and the control can be simplified. For example, when N is 3 or more, it is not necessary to switch 3 phases magnetic coupling and 2 phases magnetic coupling in the conversion sets, for example. Accordingly, the control can be simplified.

When the driving phase number X is a multiple of N (the condition Not (A)), the controller drives the conversion parts of all N phases included in each of X/N sets of the conversion sets, and the controller does not need to drive the conversion parts of all N phases included in each of remaining (M−X/N) sets of the conversion sets.

When the condition Not (A) and the condition (B) are simultaneously satisfied, the control of the case where the condition Not (A) is satisfied, may be performed.

Hereinafter, examples of the case where the condition Not (A) is satisfied, will be described. The disclosed embodiments are not limited to the following examples, and the disclosed embodiments encompass any cases where the condition Not (A) is satisfied.

For example, in a converter including 2 sets of conversion sets that the conversion parts of 2 phases are capable of magnetic coupling to each other, among the conversion parts of a total of 4 phases, only 2 phases are driven. In this case, X is 2; N is 2; M is 2; and among the conversion parts of 2 phases included in 1 of 2 sets of the conversion sets, the conversion parts of all 2 phases are driven, and the conversion parts of 2 phases included in the remaining 1 set of the conversion set, are not driven.

For example, in a converter including 3 sets of conversion sets that the conversion parts of 2 phases are capable of magnetic coupling to each other, among the conversion parts of a total of 6 phases, only 2 phases are driven. In this case, X is 2; N is 2; M is 3; and among the conversion parts of 2 phases included in 1 of 3 sets of the conversion sets, the conversion parts of all 2 phases are driven, and the conversion parts of 2 phases included in each of the remaining 2 sets of the conversion sets, are not driven.

For example, in a converter including 3 sets of conversion sets that the conversion parts of 2 phases are capable of magnetic coupling to each other, among the conversion parts of a total of 6 phases, only 4 phases are driven. In this case, X is 4; N is 2; M is 3; and among the conversion parts of 2 phases included in each of 2 of 3 sets of the conversion sets, the conversion parts of all 2 phases are driven, and the conversion parts of 2 phases included in the remaining 1 set of the conversion set are not driven.

For example, in a converter including 2 sets of conversion sets that the conversion parts of 3 phases are capable of magnetic coupling to each other, among the conversion parts of a total of 6 phases, only 3 phases are driven. In this case, X is 3; N is 3; M is 2; and among the conversion parts of 3 phases included in 1 of 2 sets of the conversion sets, the conversion parts of all 3 phases are driven, and the conversion parts of 3 phases included in the remaining 1 set of the conversion set are not driven.

For example, in a converter including 3 sets of conversion sets that the conversion parts of 3 phases are capable of magnetic coupling to each other, among the conversion parts of a total of 9 phases, only 6 phases are driven. In this case, X is 6; N is 3; M is 3; and among the conversion parts of 3 phases included in each of 2 of 3 sets of the conversion sets, the conversion parts of all 3 phases are driven, and the conversion parts of 3 phases included in the remaining 1 set of the conversion set are not driven.

Figure 2:
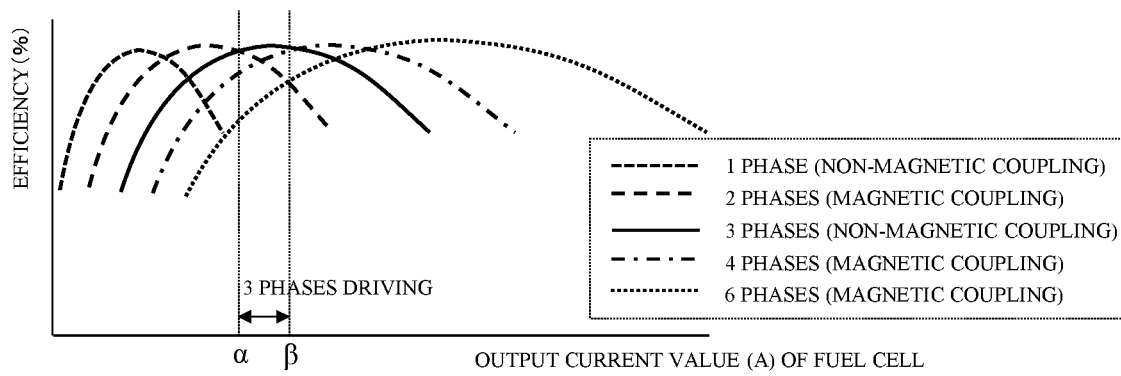
FIG. 2 is a graph comparing, for the numbers of the driving phases of the conversion parts, relationships between the output current value of a fuel cell 10 and the efficiency of a boost converter 20.

FIG. 2 is a graph comparing, for the numbers of the driving phases of the conversion parts, relationships between the output current value of a fuel cell 10 and the efficiency of a boost converter 20.

In the boost converter 20, the current range where high efficiency is obtained differs depending on the number of the phases of driving conversion parts. For example, when an output current value from the fuel cell is α or more and less than β, since efficiency is best when driving the conversion parts of 3 phases, the conversion parts of 3 phases may be driven.

In the disclosed embodiments, when the conditions (A) and (B) are satisfied, among a total of 6 phases shown in FIG. 1, the conversion parts of 3 driving phases select and drive the conversion part of 1 phase from the conversion sets of (U-V phase), (W-X phase) and (Y-Z phase) that are capable of magnetic coupling to each other.

As described in Patent Literatures 1 and 2, in the case of operation only with a multiple of the number of magnetically coupled phases, when the conversion parts of every 2 phases are magnetically coupled, operation is only possible with a phase number that is a multiple of 2, and efficiency decreases when current is α or more and less than β.

According to the disclosed embodiments, therefore, since the conversion parts of 3 phases can be driven, efficient boosting is possible even when output current is in a range of α or more and less than β. In addition, since the conversion parts of 3 driving phases are not magnetically coupled to each other, current can be evenly passed through them.

When the number of the phases of driving conversion parts is a multiple of 2, as with Patent Literatures 1 and 2, to satisfy the condition Not (A), 2 phases of magnetically coupled conversion parts of each conversion set may be driven. Even in this case, current can be evenly passed through the driving phases.

As described above, by switching the control of driving phases depending on the case where the conditions (A) and (B) are satisfied and the case where the condition Not (A) is satisfied, among a total of 6 phases shown in FIG. 1, including the 1 phase driving of the condition (C), driving with 1 phase, 2 phases, 3 phases, 4 phases or 6 phases is possible. In this case, driving with 5 phases is excluded. However, when the number of driving phases is relatively large (such as 4 phases and 6 phases), since depression of efficiency between them is generally small, a decrease in efficiency can be small even if driving with 5 phases is excluded. On the other hand, when the number of driving phases is relatively small (such as 2 phases and 4 phases), depression of efficiency between them increases. However, since driving with 3 phases is possible, a decrease in efficiency can be small.

Figure 3:
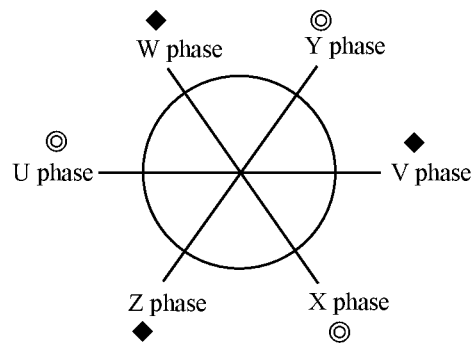
FIG. 3 is a view of an example of the combination of the driving phases.

FIG. 3 is a view of an example of the combination of the driving phases.

When, at the time of determining driving phases, 3 driving phases are selected from the conversion parts of 6 phases, they may be selected so that the phase differences are displaced by 120 degrees (the phase differences of the phases are equal).

For example, in a converter including the conversion parts of 6 phases of U, V, W, X, Y and Z phases, the U and V phases are magnetically coupled to each other; the W and X phases are magnetically coupled to each other; and the Y and Z phases are magnetically coupled to each other. As shown in FIG. 3, using the U phase as a reference, the phase difference of the V phase, that of the W phase, that of the X phase, that of the Y phase and that of the Z phase are displaced and fixed by 180 degrees, degrees, 240 degrees, 120 degrees and 300 degrees, respectively. The phase difference between the magnetically coupled phases is 180 degrees. At this time, as 3 driving phases, a combination of (U phase, X phase, Y phase) (a combination of double circles in FIG. 3) or a combination of (V phase, W phase, Z phase) (a combination of black rhombuses in FIG. 3) is selected. Accordingly, ripple current can be small, and heat generation from the capacitor can be reduced. As described above, since the phase differences of the phases are fixed, it is not needed to change the phase differences of the phases in the middle, and control programs can be simplified.

When, among the conversion parts of 6 phases, only 2 phases are driven, one of the following combinations is selected: (U phase+V phase), (W phase+X phase) and (Y phase+Z phase). In any combination, the phase differences of the driving phases are 180 degrees and equal. Accordingly, ripple current is reduced.

When, among the conversion parts of 6 phases, 4 phases are driven, any two conversion sets may be selected from the following combinations: (U phase+V phase), (W phase+X phase) and (Y phase+Z phase), and they may be driven without changing the phase differences of the phases.

Also, the phase differences may be changed so that the phase differences of the phases are displaced by 90 degrees, and any two conversion sets may be selected and driven from the following combinations: (U phase+V phase), (W phase+X phase) and (Y phase+Z phase). Even in this case, it is not needed to change the phase differences as long as the phase number is in a range of from 1 to 3 phases. Accordingly, control programs can be simplified.

In any of the above-described cases, the phase differences of driving phases may be equal or may be divided to be close to this. In any of the above cases, when the phase number X of driving conversion parts is a multiple of the phase number N of magnetically coupled conversion parts, it is applicable in combination with driving magnetically coupled phases.

In the embodiments shown in FIGS. 1 to 3, especially in a region where the driving phase number of the conversion parts is small, driving with a desired phase number is possible. Accordingly, a decrease in efficiency can be suppressed. As described above, when the conversion parts of only 3 phases are driven, their booster circuits can select and drive a booster circuit which is not magnetically coupled. Accordingly, in the case of magnetic coupling and in the case of non-magnetic coupling, control conditions such as feedback gain can be changed, and boost control can be performed.

In the case of 5 phases driving, if 3 phases magnetic coupling and 2 phases magnetic coupling are mixed, due to their different current waveforms, ripple current may increase. However, by avoiding different driving phase numbers between conversion sets, an increase in ripple current can be suppressed. Also, if the number of magnetically coupled phases changes, it is needed to change control software, and the frequency of switching control increases and results in complicated control. However, by avoiding different driving phase numbers between conversion sets, control can be simplified. In addition, the occurrence of hunting or the like at the timing to switch control, can be suppressed.

When the driving phase number X is not a multiple of N (the condition (A)) and the driving phase number X cannot be represented by a product YZ of the conversion parts of Y (Y is a natural number of N−1 or less) phases and Z (Z is a natural number of 2 or more and M or less) sets of the conversion sets (the condition Not (B)), the controller may change the driving phase number X of the conversion parts to a driving phase number X' different from the driving phase number X.

The driving phase number X' may be larger or smaller than X.

For example, the driving phase number X' may be X+1 so that the condition Not (A) or the condition (B) is satisfied. Even in this case, if the condition Not (A) or the condition (B) is not satisfied, the driving phase number X' may be X+2. This may be repeated until the condition Not (A) or the condition (B) is satisfied. The reason for increasing the driving phase number X' larger than X is that by increasing the driving phase number, the value of current per phase decreases, and the amount of generated heat can be reduced.

The driving phase number X' may be X−1 so that the condition Not (A) or the condition (B) is satisfied. Even in this case, if the condition Not (A) or the condition (B) is not satisfied, the driving phase number X' may be X−2. This may be repeated until the condition Not (A) or the condition (B) is satisfied.

When the driving phase number X is not a multiple of N (the condition (A)), when the driving phase number X cannot be represented by a product YZ of the conversion parts of Y (Y is a natural number of N−1 or less) phases and Z (Z is a natural number of 2 or more and M or less) sets of the conversion sets (the condition Not (B)), and when the driving phase number X is not 1 (a condition Not (C)), the controller may change the driving phase number X of the conversion parts to the driving phase number X' different from the driving phase number X.

Hereinafter, examples of the case where the condition (A) and the condition Not (B) are satisfied, will be described. The disclosed embodiments are not limited to the following examples, and the disclosed embodiments encompass any cases where the condition (A) and the condition Not (B) are satisfied.

For example, in a converter including 3 sets of conversion sets that the conversion parts of 2 phases are capable of magnetic coupling to each other, among the conversion parts of a total of 6 phases, only 5 phases are driven. In this case, X is 5; N is 2; M is 3; Y is 1; Z is 2 or 3; YZ is 2 or 3; X cannot be represented by YZ; and the condition (B) is not satisfied. However, the condition Not (A) is satisfied by changing X from 5 to 6.

For example, in a converter including 3 sets of conversion sets that the conversion parts of 3 phases are capable of magnetic coupling to each other, among the conversion parts of a total of 9 phases, only 5 phases are driven. In this case, X is 5; N is 3; M is 3; Y is 1 or 2; Z is 2, 3 or 4; YZ is 2, 3, 4, 6 or 8; X cannot be represented by YZ; and the condition (B) is not satisfied. However, the condition Not (A) is satisfied by changing X from 5 to 6.

For example, in a converter including 3 sets of conversion sets that the conversion parts of 3 phases are capable of magnetic coupling to each other, among the conversion parts of a total of 9 phases, only 7 phases are driven. In this case, X is 7; N is 3; M is 3; Y is 1 or 2; Z is 2, 3 or 4; YZ is 2, 3, 4, 6 or 8; X cannot be represented by YZ; and the condition (B) is not satisfied. However, the conditions (A) and (B) are satisfied by changing X from 7 to 8.

The controller may select the driving phase number X of the conversion part to satisfy at least one of the condition Not (A) that the driving phase number X is a multiple of N and the condition (B) that the driving phase number X is represented by a product YZ of the conversion part of Y (Y is a natural number of N−1 or less) phase and Z (Z is a natural number of 2 or more and M or less) sets of the conversion sets.

The controller may select the driving phase number X of the conversion part to satisfy any one of the condition Not (A) that the driving phase number X is a multiple of N, the condition (B) that the driving phase number X is represented by a product YZ of the conversion part of Y (Y is a natural number of N−1 or less) phase and Z (Z is a natural number of 2 or more and M or less) sets of the conversion sets, and the condition (C) that the driving phase number X is 1.

Accordingly, it is not needed to control and change the driving phase number X of the conversion parts to the driving phase number X', and control can be simplified.

Figure 4:
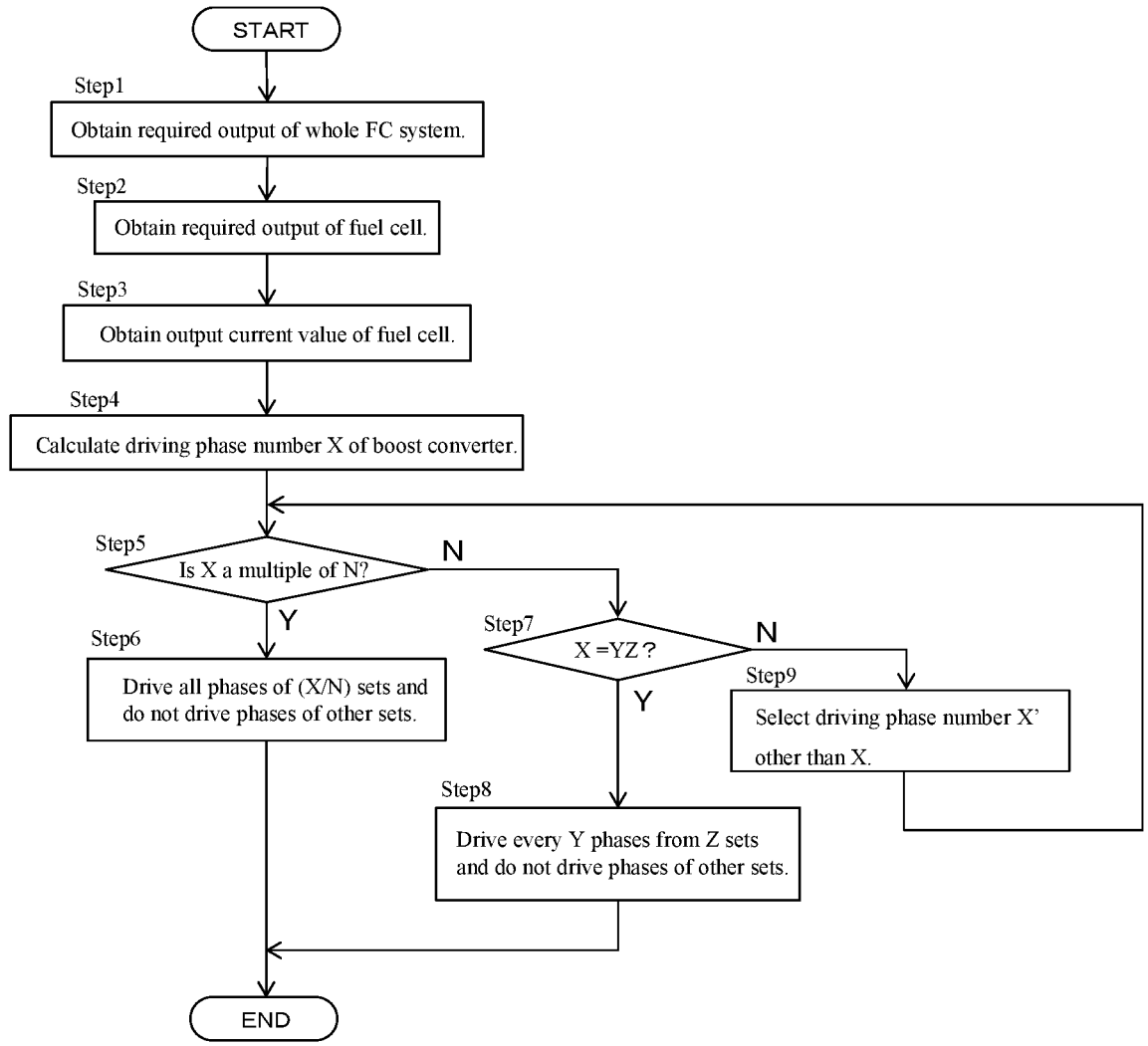
FIG. 4 is a flowchart of an example of the method for determining the driving phases.

FIG. 4 is a flowchart of an example of the method for determining the driving phases.

The program shown by the flowchart of FIG. 4 may be repeatedly run at given intervals during the startup of the fuel cell (FC) system.

In Step 1, from information such as the speed and accelerator position of the vehicle and the load of an FC system auxiliary instrument and a vehicle auxiliary instrument, the controller obtains the required output of the whole FC system. The FC system includes a fuel cell stack and a battery, and the required output of the whole FC system corresponds to the total output of them. The battery may be a chargeable/dischargeable battery. As the battery, examples include, but are not limited to, conventionally-known batteries such as a nickel-hydrogen secondary battery and a lithium ion secondary battery. Also, the battery may be a battery including a power storage device such as an electric double layer capacitor.

In Step 2, considering the state of charge (SOC) value of the battery, etc., the controller calculates the required output that should be output from, among the whole system, the fuel cell. The state of charge (SOC) value means the percentage of the charge capacity with respect to the full charge capacity of the secondary cell. The full charge capacity is a SOC of 100%.

In Step 3, using the required output of the fuel cell and the I-V characteristics or I-P characteristics of the fuel cell, the controller obtains an output current value. The I-V characteristics or I-P characteristics may be stored in the ECU in advance. The I-V characteristics or I-P characteristics may be updated as needed, according to the conditions of the fuel cell at that time (e.g., operation conditions such as deterioration condition and wetting/drying).

In Step 4, the controller calculates the driving phase number X of the boost converter. The controller may determine the driving phase number X from the characteristics shown in FIG. 2, for example. The relationship between the current value and the driving phase number X may be stored in the ECU as a map.

In Step 5, the controller decides whether the driving phase number X is a multiple of N or not. If YES (the condition Not (A) is satisfied), the controller continues to Step 6. If NO (the condition (A) is satisfied), the controller continues to Step 7.

In Step 6, the controller drives all of the phases of (X/N) sets and does not drive any of the phases of other (M−X/N) sets. Then, the controller terminates the control.

In Step 7, the controller decides whether X can be represented by YZ or not. If YES (the condition (B) is satisfied), the controller continues to Step 8. If NO (the condition Not (B) is satisfied), the controller continues to Step 9.

In Step 8, the controller drives every Y phases from Z sets and does not drive any of the phases of other (M−Z) sets. Then, the controller terminates the control.

In Step 9, the controller selects the driving phase number X' other than X and returns to Step 5.

In Step 4, the controller may be controlled not to select such a driving phase number that results in NO (the condition Not (B) is satisfied) in Step 7. For example, selectable driving phase numbers are stored on the map, and the driving phase number X is selected from the map. In this case, when NO in Step 5, Step 8 can be immediately run, and Step 7 and Step 9 become non-existent. As a result, the time required to determine driving phases can be reduced.

REFERENCE SIGNS LIST

10: Fuel cell
20: Boost converter
21: Reactor
22: Current sensor
23: Switching device
24: Diode
25: Capacitor
50: External load

The invention claimed is:

1. A power conversion device comprising conversion parts which are coupled in parallel to each other, which are capable of voltage conversion, and each of which includes a coil,
wherein the power conversion device comprises M (M is a natural number of 2 or more) sets of conversion sets including the conversion parts of N phases (N is a natural number of 2 or more), and the coils of the conversion parts are capable of magnetic coupling to each other;
wherein the power conversion device includes a controller configured to change a driving phase number X of the conversion parts according to a system requirement;
wherein, when the driving phase number X is not a multiple of N (a condition (A)) and when the driving phase number X is represented by a product YZ of the conversion part of Y phase (Y is a natural number of N−1 or less) and Z (Z is a natural number of 2 or more and M or less) sets of the conversion sets (a condition (B)), among the conversion parts of N phases included in each of Z sets of the conversion sets, the controller drives the conversion part of Y phase, and the controller does not drive the conversion parts of all N phases included in each of remaining (M−Z) sets of the conversion sets; and
wherein, when the driving phase number X is not a multiple of N (the condition (A)) and the driving phase number X is represented by a set number of Z (Z is a natural number of 2 or more and M or less) sets of the conversion sets (a condition (B')), among the conversion parts of N phases included in each of Z sets of the conversion sets, the controller drives the conversion part of 1 phase, and the controller does not drive the conversion parts of all N phases included in each of remaining (M−Z) sets of the conversion sets.

2. The power conversion device according to claim 1, wherein a phase number N of the conversion parts included in each conversion set is 2.

3. The power conversion device according to claim 1, wherein, when the driving phase number X is a multiple of N (a condition Not (A)), the controller drives the conversion parts of all N phases included in each of X/N sets of the conversion sets, and the controller does not drive the conversion parts of all N phases included in each of remaining (M−X/N) sets of the conversion sets.

4. The power conversion device according to claim 1, wherein, when the driving phase number X is not a multiple of N (the condition (A)) and the driving phase number X cannot be represented by a product YZ of the conversion parts of Y (Y is a natural number of N−1 or less) phases and Z (Z is a natural number of 2 or more and M or less) sets of the conversion sets (a condition Not (B)), the controller changes the driving phase number X of the conversion parts to a driving phase number X' different from the driving phase number X.

5. The power conversion device according to claim 1, wherein the controller selects the driving phase number X of the conversion part to satisfy at least one of the condition Not (A) that the driving phase number X is a multiple of N and the condition (B) that the driving phase number X is represented by a product YZ of the conversion part of Y (Y is a natural number of N−1 or less) phase and Z (Z is a natural number of 2 or more and M or less) sets of the conversion sets.

* * * * *